United States Patent
Tang

(10) Patent No.: US 7,876,699 B2
(45) Date of Patent: Jan. 25, 2011

(54) MOBILE STATION AND METHOD FOR VERIFYING ACCESS POINTS THEREOF

(75) Inventor: Cheng-Wen Tang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 724 days.

(21) Appl. No.: 11/945,272

(22) Filed: Nov. 27, 2007

(65) Prior Publication Data

US 2008/0130542 A1  Jun. 5, 2008

(30) Foreign Application Priority Data

Dec. 1, 2006  (TW)  ............................... 95144716 A

(51) Int. Cl.
| | |
|---|---|
| H04L 12/28 | (2006.01) |
| G08C 17/00 | (2006.01) |
| H04B 1/04 | (2006.01) |
| H04Q 1/30 | (2006.01) |
| H04W 4/00 | (2009.01) |

(52) U.S. Cl. ....................... 370/252; 370/311; 370/338; 445/127.5; 340/7.32

(58) Field of Classification Search ........................ None
See application file for complete search history.

(56) References Cited

U.S. PATENT DOCUMENTS

| | | | |
|---|---|---|---|
| 5,991,287 A * | 11/1999 | Diepstraten et al. ......... | 370/338 |
| 6,917,598 B1 | 7/2005 | Emeott et al. | |
| 7,194,261 B2 * | 3/2007 | Emeott et al. ............ | 455/426.2 |
| 2002/0132603 A1 | 9/2002 | Lindskog et al. | |
| 2005/0135302 A1 * | 6/2005 | Wang et al. .................. | 370/346 |
| 2005/0136833 A1 | 6/2005 | Emeott et al. | |
| 2006/0056377 A1 * | 3/2006 | Wu et al. .................... | 370/345 |

* cited by examiner

*Primary Examiner*—Steven H Nguyen
(74) *Attorney, Agent, or Firm*—Frank R. Niranjan

(57) ABSTRACT

A mobile station (200) communicating with an access point (100) includes an association module (202), a mode switching module (204), a verifying module (206), and a recording module (208). The association module associates with the access point via an original address and a virtual address. The mode switching module switches between an active mode and a power saving mode. The verifying module transmits a first test frame, then transmits a data acquiring frame to the access point to acquire the first test frame, presets a period of time for receiving the first test frame, and determines whether a time when the first test frame is received is after or before the preset period of time. The recording module records whether the access point supports Frame Exchange Sequence (FES) to switch between the active mode and the power saving mode according to a determined result of the verifying module.

19 Claims, 4 Drawing Sheets

MOBILE STATION AND METHOD FOR VERIFYING ACCESS POINTS THEREOF

BACKGROUND OF THE INVENTION

1. Field of the Invention

The present invention relates to wireless communications, and particularly to a mobile station and a method for verifying access points thereof.

2. Description of Related Art

In a Wireless Local Area Network (WLAN), if a WLAN device, such as a mobile station or an access point, supports using a Request to Send (RTS) frame or a Null frame to switch between an active mode and a power saving mode, the WLAN device is considered to support Frame Exchange Sequence (FES) to switch between the active mode and the power saving mode.

In practice, not all WLAN devices support FES to switch between the active mode and the power saving mode. In some cases, a mobile station may support FES to switch between the active mode and the power saving mode, but an access point communicating with the mobile station may not support that. However, the conventional mobile station cannot verify whether the access point supports FES to switch between the active mode and the power saving mode, and correspondingly the data transmitted between the mobile station and the access point may be lost.

SUMMARY OF THE INVENTION

One aspect of the present invention provides a mobile station communicating with an access point. The mobile station includes an association module, a mode switching module, a verifying module, and a recording module. The association module associates with the access point via an original address and a virtual address of the mobile station. The mode switching module switches between an active mode and a power saving mode. The verifying module transmits a first test frame to the access point, then transmits a data acquiring frame to the access point to acquire the first test frame, presets a period of time for receiving the first test frame, and determines whether a time when the first test frame is received is before or after the preset period of time has elapsed. A source address of the first test frame is the virtual address, and a destination address of the first test frame is the original address. The recording module records whether the access point supports Frame Exchange Sequence (FES) to switch between the active mode and the power saving mode according to a determined result of the verifying module.

Another aspect of the present invention provides a method for a mobile station verifying an access point. The mobile station includes a virtual address and an original address. The method includes: associating with the access point individually via the original address and the virtual address; requesting to switch from an active mode to a power saving mode; transmitting a first test frame to the access point, wherein a source address of the first test frame is the virtual address, and a destination address of the first test frame is the original address; transmitting a data acquiring frame to the access point to acquire the first test frame; presetting a period of time for receiving the first test frame; determining whether a time when the first test frame is received is after the preset period of time has elapsed; and recording that the access point supports Frame Exchange Sequence (FES) to switch from the active mode to the power saving mode if the time when the first test frame is received is after the preset period of time has elapsed.

Other advantages and novel features will become more apparent from the following detailed description when taken in conjunction with the accompanying drawings, in which:

DETAILED DESCRIPTION OF THE INVENTION

Figure 1:
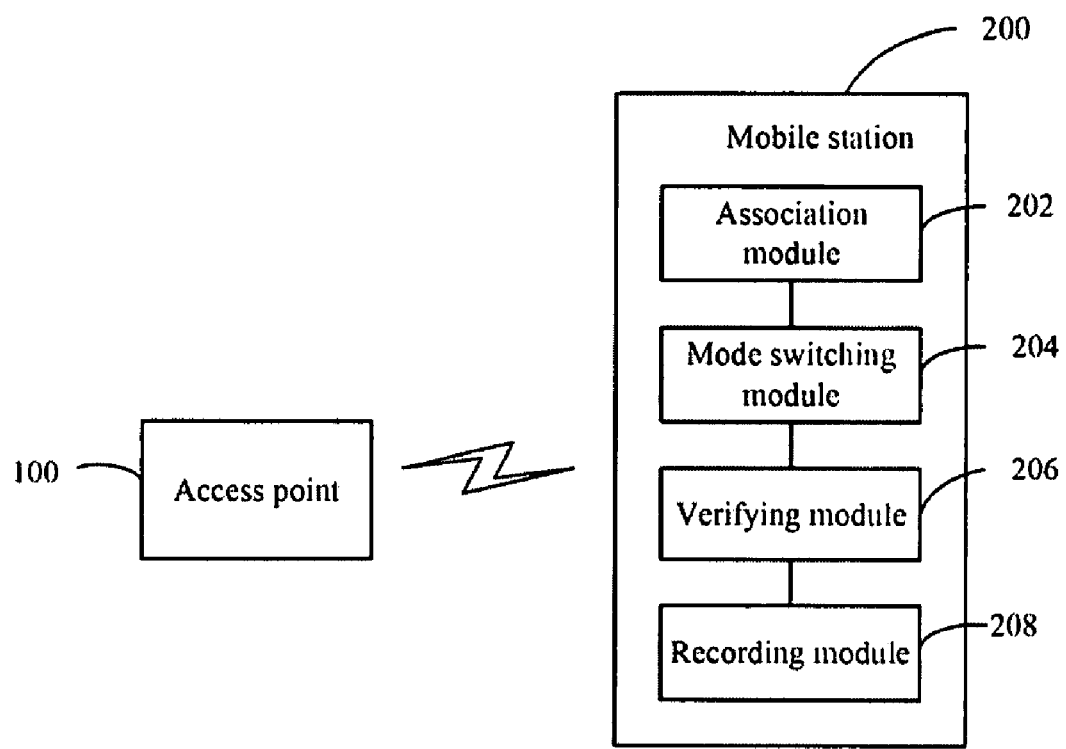
FIG. 1 is a block diagram of functional modules of a mobile station of an exemplary embodiment of the present invention.

FIG. 1 is a block diagram of functional modules of a mobile station 200 of an exemplary embodiment of the present invention. In the exemplary embodiment, the mobile station 200 communicates with an access point 100 according to the Institute of Electrical and Electronic Engineers (IEEE) protocol. The mobile station 200 has an original address and a virtual address. The original address is an actual Media Access Control (MAC) address of the mobile station 200, and the virtual address is a dummy MAC address produced by the mobile station 200.

The mobile station 200 includes an association module 202, a mode switching module 204, a verifying module 206, and a recording module 208.

The association module 202 associates with the access point 100 via the original address and the virtual address of the mobile station 200. In the exemplary embodiment, the association module 202 associates with the access point 100 according to the IEEE 802.11 protocol.

The mode switching module 204 switches between an active mode and a power saving mode. In the exemplary embodiment, the mode switching module 204 transmits a Request to Send (RTS) frame or a Null frame to switch between the active mode and the power saving mode. The RTS frame and the Null frame individually includes a Power Save Bit (PSB) field. If the mobile station 200 requests to switch from the power saving mode to the active mode, the PSB field of the RTS frame or the Null frame is set as 0. If the mobile station 200 requests to switch from the active mode to the power saving mode, the PSB field of the RTS frame or the Null frame is set as 1.

The verifying module 206 transmits a first test frame to the access point 100, then transmits a data acquiring frame to the access point 100 to acquire the first test frame, and presets a period of time for receiving the first test frame. A source address of the first test frame is the virtual address, and a destination address of the first test frame is the original address.

In the exemplary embodiment, the verifying module 206 transmits the first test frame to the access point after the association module 202 associates with the access point 100. The data acquiring frame may be a Power Save Poll (PS-Poll) frame. The preset period of time for receiving the first test frame is equal to the time difference between the time of transmitting the first test frame and the time of transmitting the data acquiring frame. In this embodiment, the preset period of time may be 5 seconds.

The verifying module 206 further determines whether a time when the first test frame is received is before or after the preset period of time has elapsed. In the exemplary embodiment, if the time when the first test frame is received is after the preset period of time has elapsed, the access point 100 is determined to support Frame Exchange Sequence (FES) to switch from the active mode to the power saving mode. If the time when the first test frame is received is before or when the preset period of time has elapsed, the access point 100 is determined not to support FES to switch from the active mode to the power saving mode.

In detail, after the mode switching module 204 requests to switch from the active mode to the power saving mode, the verifying module 206 transmits the first test frame to the access point 100, and then transmits the data acquiring frame to the access point 100 to acquire the first test frame from the access point 100. If supporting FES to switch from the active mode to the power saving mode, the access point 100 will transmit the first test frame to the mobile station 200 after receiving the data acquiring frame. If not supporting FES to switch from the active mode to the power saving mode, the access point 100 will transmit the first test frame before receiving the data acquiring frame.

The verifying module 206 further transmits a second test frame to the access point 100, and determines whether the second test frame is received. A source address of the second test frame is the virtual address, and a destination address of the second test frame is the original address. In the exemplary embodiment, when the mobile station 200 requests to switch from the power saving mode to the active mode, the verifying module 206 transmits the second test frame to the access point 100, and then determines whether the second test frame is received.

In this embodiment, after the mode switching module 204 requests to switch from the power saving mode to the active mode, the access point 100 supporting FES to switch from the power saving mode to the active mode will transmit the second test frame to the mobile station 200 after receiving the second test frame. The access point 100 not supporting FES to switch from the power saving mode to the active mode will not transmit the second test frame after receiving the second test frame.

The recording module 208 records whether the access point 100 supports FES to switch between the active mode and the power saving mode according to a determined result of the verifying module 206. In the exemplary embodiment, the recording module 208 may record that the access point 100 supports or does not support FES to switch from the active mode to the power saving mode or from the power saving mode to the active mode.

Figure 2:
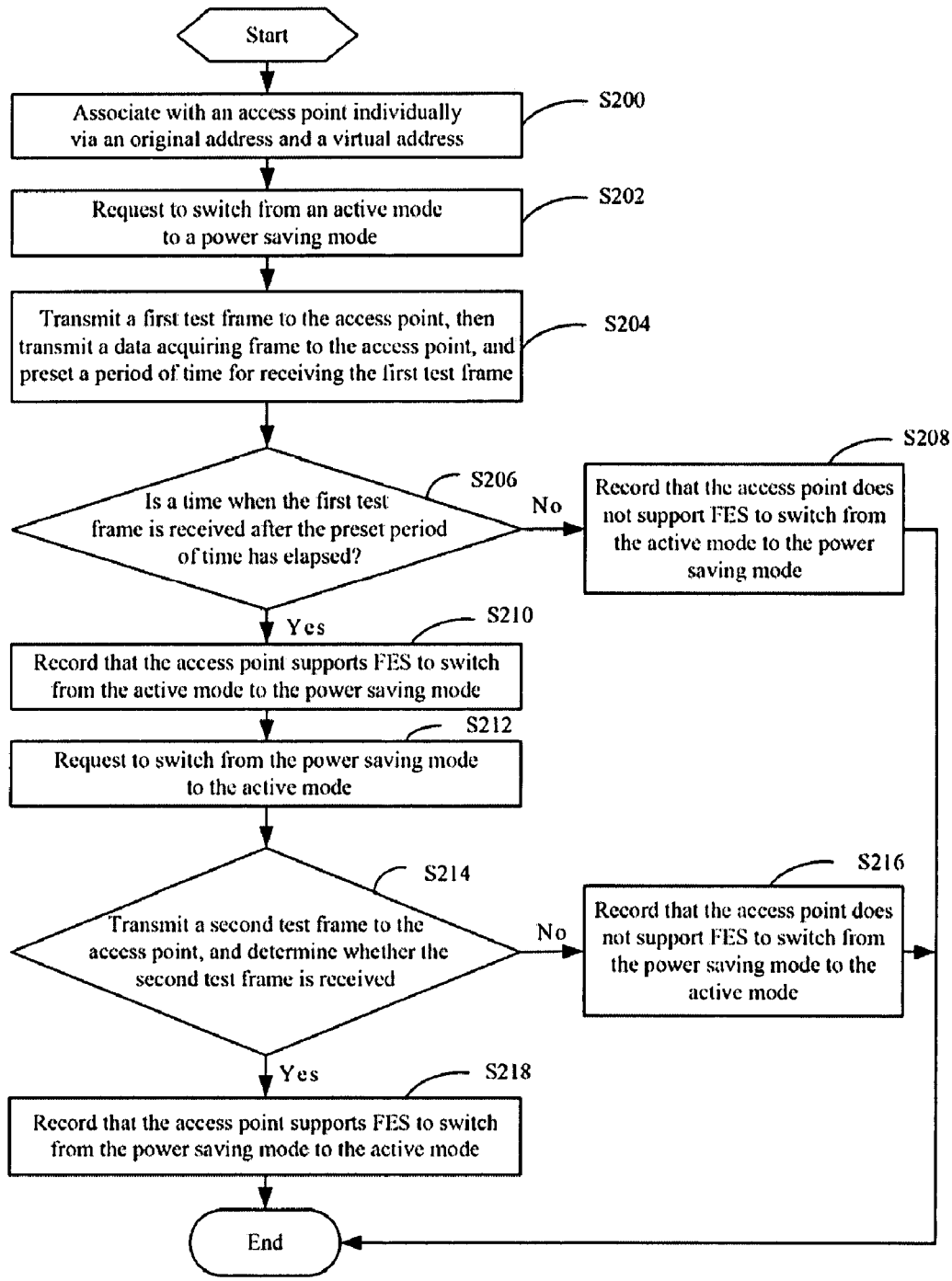
FIG. 2 is a flowchart of a method for verifying access points of another exemplary embodiment of the present invention.

FIG. 2 is a flowchart of a method for verifying access points of an exemplary embodiment of the present invention.

In step S200, the mobile station 200 associates with the access point 100 individually via the original address and the virtual address of the mobile station 200. In the exemplary embodiment, the original address and the virtual address are both MAC addresses.

In step S202, the mobile station 200 requests to switch from an active mode to a power saving mode. In the exemplary embodiment, the mobile station 200 transmits an RTS frame or a Null frame to the access point 100 to request to switch from the active mode to the power saving mode.

In step S204, the mobile station 200 transmits a first test frame to the access point 100, then transmits a data acquiring frame to the access point 100 to acquire the first test frame, and presets a period of time for receiving the first test frame. A source address of the first test frame is the virtual address, and a destination address of the first test frame is the original address. In the exemplary embodiment, the data acquiring frame is a PS-Poll frame, and the preset period of time is equal to the time difference between the time of transmitting the first test frame and the time of transmitting the PS-Poll frame. In this embodiment, the preset period of time may be 5 seconds.

In step S206, the mobile station 200 determines whether a time when the first test frame is received is after the preset period of time has elapsed. In the exemplary embodiment, if supporting FES to switch from the active mode to the power saving mode, the access point 100 will transmit the first test frame to the mobile station 200 after the preset period of time has elapsed. If not supporting FES to switch from the active mode to the power saving mode, the access point 100 will transmit the first test frame to the mobile station 200 before the preset period of time has elapsed.

If the time when the first test frame is received is after the preset period of time has elapsed, in step S210, the mobile station 200 records that the access point 100 supports FES to switch from the active mode to the power saving mode.

If the time when the first test frame is received is before or when the preset period time has elapsed, in step S208, the mobile station 200 records that the access point 100 does not support FES to switch from the active mode to the power saving mode.

In step S212, the mobile station 200 requests to switch from the power saving mode to the active mode.

In step S214, the mobile station 200 transmits a second test frame to the access point 100, and determines whether the second test frame is received. A source address of the second test frame is the virtual address, and a destination address of the second test frame is the original address.

If the second test frame is received, in step S218, the mobile station 200 records that the access point 100 supports FES to switch from the power saving mode to the active mode.

If the second test frame is not received, in step S216, the mobile station 200 records that the access point 100 does not support FES to switch from the power saving mode to the active mode.

Figure 3A:
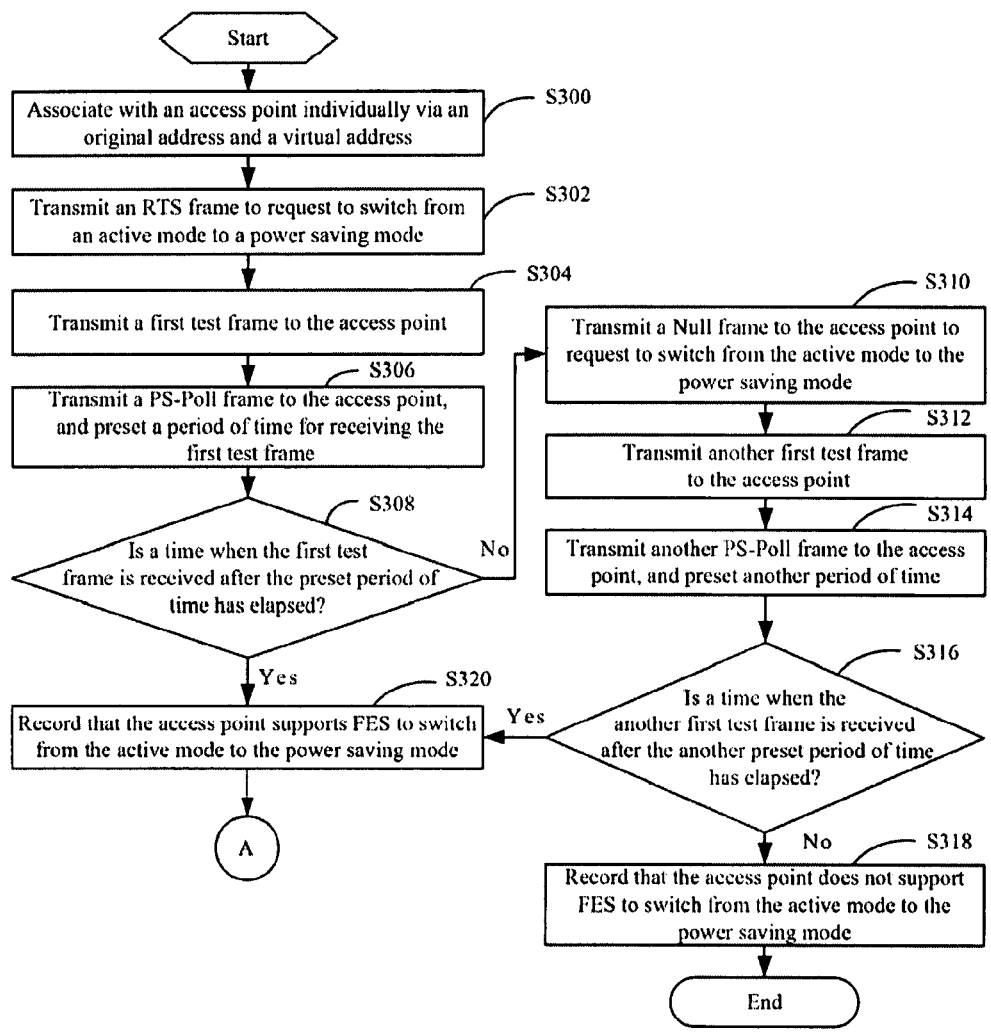
FIGS. 3A and 3B are detailed flowcharts of the method for verifying access points of FIG. 2.
Figure 3B:
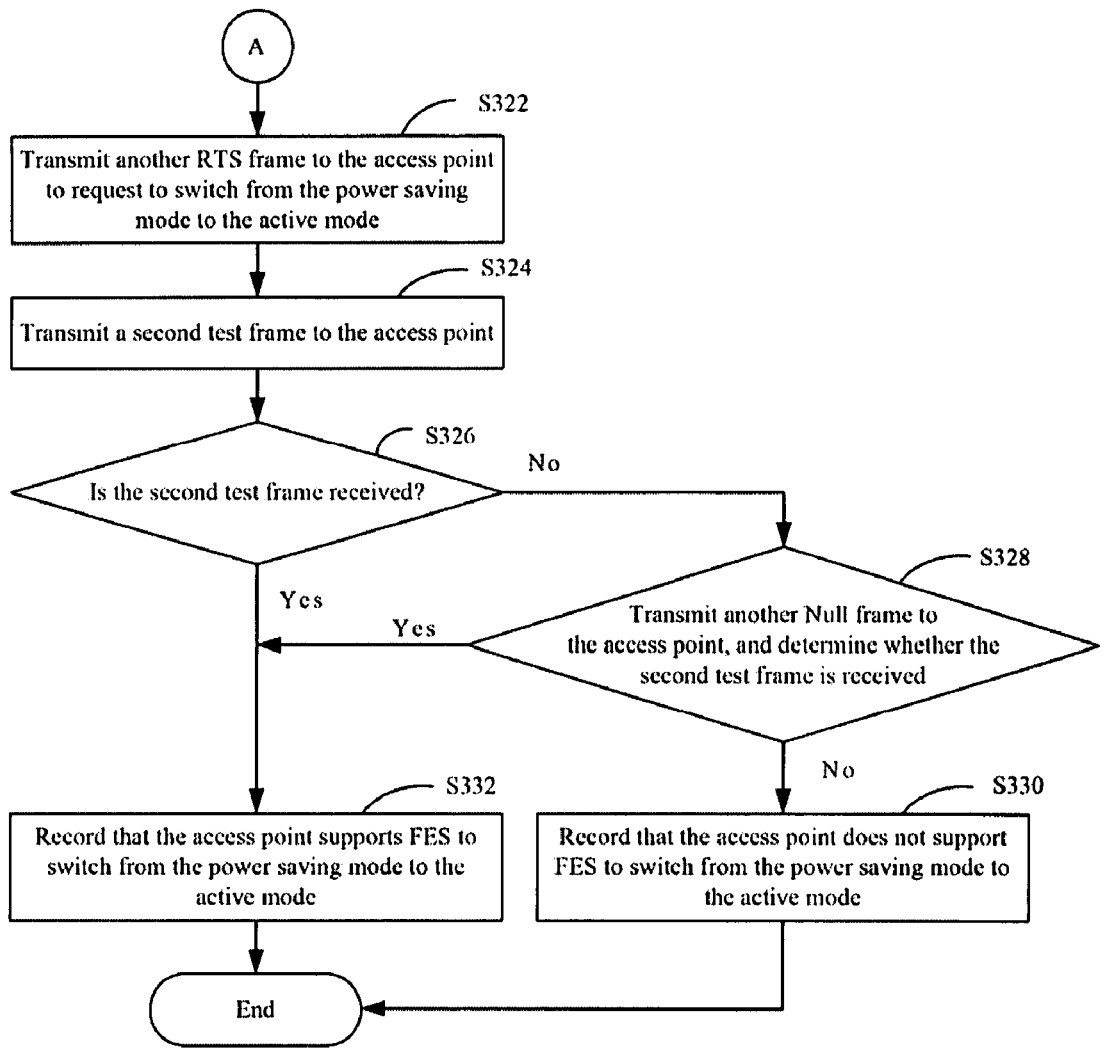

FIGS. 3A and 3B are detailed flowcharts of the method for verifying access points of FIG. 2.

In step S300, the mobile station 200 associates with the access point 100 individually via the original address and the virtual address of the mobile station 200.

In step S302, the mobile station 200 transmits an RTS frame to request to switch from an active mode to a power saving mode. In the exemplary embodiment, the access point 100 receives the RTS frame, and then transmits a Clear to Send (CTS) frame to the mobile station 200, indicating that the RTS frame has been received. In this embodiment, the PSB field of the RTS frame is set as 1.

In step S304, the mobile station 200 transmits a first test frame to the access point 100. A source address of the first test frame is the virtual address, and a destination address of the second test frame is the original address. In the exemplary embodiment, the mobile station 200 transmits the first test frame to the access point 100 after receiving the CLS frame from the access point.

In step S306, the mobile station 200 transmits a PS-Poll frame the access point 100, and presets a period of time for receiving the first test frame. In the exemplary embodiment, the preset period of time is equal to the time difference between the time of transmitting the first test frame and the time of transmitting the PS-Poll frame. The preset period of time may be 5 seconds.

In step S308, the mobile station 200 determines whether a time when the first test frame is received is after the preset period of time has elapsed.

If the time when the first test frame is received is after the preset period of time has elapsed, the access point 100 is determined to support FES to switch from the active mode to the power saving mode, and the mobile station 200 has successfully switched to the power saving mode. In such case, in step S320, the mobile station 200 records that the access point 100 supports FES to switch from the active mode to the power saving mode.

If the time when the first test frame is received is before or when the preset period of time has elapsed, the access point 200 is determined not to support FES to switch from the active mode to the power saving mode, and the mobile station 200 does not successfully switch to the power saving mode. In such case, in step S310, the mobile station 200 transmits a Null frame to the access point 100 to request to switch from the active mode to the power saving mode again. In this embodiment, the access point 100 transmits an acknowledgement frame to the mobile station 200 after receiving the Null frame. The PSB field of the Null frame is set as 1.

In step S312, the mobile station 200 transmits another first test frame to the access point 100. In this embodiment, the mobile station 200 transmits the another first test frame to the access point after receiving the acknowledgement frame from the access point.

In step S314, the mobile station 200 transmits another PS-Poll frame to the access point 100, and presets another period of time for receiving the another first test frame. In this embodiment, the another preset period of time is equal to the time difference between the time of transmitting the another first test frame and the time of transmitting the another PS-Poll frame. The another preset period of time may be 5 seconds.

In step S316, the mobile station 200 determines whether a time when the another first test frame is received is after the another preset period of time has elapsed.

If the time when the another first test frame is received is after the another preset period of time has elapsed, the access point 100 is determined to support FES to switch from the active mode to the power saving mode, and the mobile station 200 has successfully switched to the power saving mode. In such case, in step S320, the mobile station 200 records that the access point 100 supports FES to switch from the active mode to the power saving mode.

If the time when the another test frame is received is before or when the another preset period of time has elapsed, the access point 100 is determined not to support FES to switch from the active mode to the power saving mode, and the mobile station 200 does not successfully switch to the power saving mode. In such case, in step S318, the mobile station records that the access point 100 does not support FES to switch from the active mode to the power saving mode.

In step S322, the mobile station 200 transmits another RTS frame to the access point 100 to request to switch from the power saving mode to the active mode. In this embodiment, the access point 100 transmits a CTS frame to the mobile station 200 after receiving the RTS frame from the mobile station 200, indicating that the RTS frame has been received. The PSB field of the RTS frame is set as 0.

In step S324, the mobile station 200 transmits a second test frame to the access point. A source address of the second test frame is the virtual address, and a destination address of the second test frame is the original address. In this embodiment, the mobile station 200 transmits the second test frame after receiving the CLS frame.

In step S326, the mobile station 200 determines whether the second test frame is received.

If the second test frame is received, the access point 100 is determined to support FES to switch from the power saving mode to the active mode, and the mobile station 200 has successfully switched to the active mode. In such case, in step S332, the mobile station 200 records that the access point 100 supports FES to switch from the power saving mode to the active mode.

If the second test frame is not received, the access point 100 is determined not to support FES to switch from the power saving mode to the active mode, and the mobile station 200 does not successfully switch to the active mode. In such case, in step S328, the mobile station 200 transmits another Null frame to request to switch from the power saving mode to the active mode again, and determines whether the second test frame is received. In this embodiment, the PSB field of the Null frame is set as 0.

If the second test frame is received, the access point 100 is determined to support FES to switch from the power saving mode to the active mode, and the mobile station 200 has successfully switched to the active mode. In such case, in step S332, the mobile station 200 records that the access point 100 supports FES to switch from the power saving mode to the active mode.

If the second test frame is not received, the access point 100 is determined not to support FES to switch from the power saving mode to an active mode, and the mobile station 200 does not successfully switch to the active mode. In such case, in step S330, the mobile station 200 records that the access point 100 does not support FES to switch from the power saving mode to the active mode.

Thus, the mobile station 200 can verify whether the access point 100 supports FES to switch between the active mode and the power saving mode, and accordingly loss of the data transmitted between the mobile station 200 and the access point 100 is avoided.

While various embodiments and methods of the present invention have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. A mobile station adapted for communicating with an access point, the mobile station comprising:
    an association module for associating with the access point via an original address and a virtual address of the mobile station;
    a mode switching module for switching between an active mode and a power saving mode;
    a verifying module for transmitting a first test frame to the access point, then transmitting a data acquiring frame to the access point to acquire the first test frame, presetting a period of time for receiving the first test frame, and determining whether a time when the first test frame is received is after or before the preset period of time has elapsed, wherein a source address of the first test frame is the virtual address, and a destination address of the first test frame is the original address; and
    a recording module for recording whether the access point supports Frame Exchange Sequence (FES) to switch between the active mode and the power saving mode according to a determined result of the verifying module.

2. The mobile station as claimed in claim 1, wherein the mode switching module is further for transmitting one of a Request To Send (RTS) frame and a Null frame to the access point to request to switch from the active mode to the power saving mode.

3. The mobile station as claimed in claim 2, wherein the RTS frame and the Null frame individually comprises a Power Save Bit (PSB) field.

4. The mobile station as claimed in claim 2, wherein the recording module is further for recording that the access point supports FES to switch from the active mode to the power saving mode if the time when the first test frame is received is after the preset period of time has elapsed, and that the access point does not support FES to switch from the active mode to the power saving mode if the time when the first test frame is received is before or when the preset period of time has elapsed.

5. The mobile station as claimed in claim 1, wherein the preset period of time is equal to the time difference between the time of transmitting the first test frame and the time of transmitting the data acquiring frame.

6. The mobile station as claimed in claim 1, wherein the data acquiring frame is a Power Save Poll (PS-Poll) frame.

7. The mobile station as claimed in claim 1, wherein the mode switching module is further for transmitting one of a Request To Send (RTS) frame and a Null frame with a PSB field to the access point to request to switch from the power saving mode to the active mode.

8. The mobile station as claimed in claim 7, wherein the verifying module is further for transmitting a second test frame to the access point and determining whether the second test frame is received, and a source address of the second test frame is the virtual address, and a destination address of the second test frame is the original address.

9. The mobile station as claimed in claim 8, wherein the recording module is further for recording that the access point supports FES to switch from the power saving mode to the active mode when the second test frame is received, and that the access point does not support FES to switch from the active mode to the power saving mode when the second test frame is not received.

10. A method for a mobile station verifying an access point, the mobile station comprising a virtual address and an original address, the method comprising:
    associating with the access point individually via the original address and the virtual address;
    requesting to switch from an active mode to a power saving mode;
    transmitting a first test frame to the access point, wherein a source address of the first test frame is the virtual address, and a destination address of the first test frame is the original address;
    transmitting a data acquiring frame to the access point to acquire the first test frame;
    presetting a period of time for receiving the first test frame;
    determining whether a time when the first test frame is received is after the preset period of time has elapsed; and
    recording that the access point supports Frame Exchange Sequence (FES) to switch from the active mode to the power saving mode if the time when the first test frame is received is after the preset period of time has elapsed.

11. The method as claimed in claim 10, further comprising:
    recording that the access point does not support FES to switch from the active mode to the power saving mode if the time when the first test frame is received is before or when the preset period of time has elapsed.

12. The method as claimed in claim 10, wherein requesting to switch from an active mode to a power saving mode comprises:
    transmitting one of a Request to Send (RTS) frame and a Null frame to the access point to request to switch from the active mode to the power saving mode.

13. The method as claimed in claim 10, further comprising:
    requesting to switch from the power saving mode to the active mode;
    transmitting a second test frame to the access point, wherein a source address of the second test frame is the virtual address, and a destination of the second test frame is the original address;
    determining whether the second test frame is received; and
    recording that the access point supports FES to switch from the power saving mode to the active mode if the second test frame is received.

14. The method as claimed in claim 13, further comprising:
    recording that the access point does not support FES to switch from the power saving mode to the active mode if the second test frame is not received.

15. The method as claimed in claim 13, wherein requesting to switch from the power saving mode to the active mode comprises:
    transmitting one of an RTS frame or a Null frame to the access point to request to switch from the power saving mode to the active mode.

16. The method as claimed in claim 10, wherein the preset period of time is equal to the time difference between the time of transmitting the first test frame and the time of transmitting the data acquiring frame.

17. The method as claimed in claim 10, wherein the data acquiring frame is a Power Save Poll (PS-Poll) frame.

18. A method for a mobile station verifying an access point, comprising:
    associating with said access point by said mobile station via an original address of said mobile station;
    associating with said access point by said mobile station via a virtual address of said mobile station;
    requesting to switch said mobile station between an active mode thereof and a power saving mode thereof;
    transmitting a test frame to said access point via said virtual address of said mobile station; and
    recording that said access point supports Frame Exchange Sequence (FES) to switch said mobile station between said active mode thereof and said power saving mode thereof when said test frame is received by said mobile station via said original address thereof; wherein when said mobile station is requested to switch from said active mode thereof to said power saving mode thereof, after the step of transmitting said test frame, the method further comprises requesting to acquire said transmitted test frame from said access point via said original address of said mobile station; presetting a period of time for acquiring said test frame; and recording that said access point supports FES when said test frame is received by said mobile station after said preset period of time has elapsed.

19. The method as claimed in claim 18, wherein a source address of said test frame is said virtual address, and a destination address of said test frame is said original address.

* * * * *